Clarke & Dickey.
Lubricating Journal.
N°. 91,603. Patented Jan. 22, 1869.

Witnesses;
W. H. Harmon
J. B. Mason

Inventor;
G. E. Clarke
Ed. P. Dickey

United States Patent Office.

G. E. CLARKE AND EDWIN P. DICKEY, OF RACINE, WISCONSIN.

Letters Patent No. 91,603, dated June 22, 1869.

IMPROVED LUBRICATING-JOURNAL.

The Schedule referred to in these Letters Patent and making part of the same.

*To all whom it may concern:*

Be it known that we, G. E. CLARKE and EDWIN P. DICKEY, of the city and county of Racine, and State of Wisconsin, have invented a new and useful Improvement in Self-Lubricating Axles; and we do hereby declare that the following is a full, clear, and exact description thereof, which will enable those skilled in the art to make and use the same, reference being had to the accompanying drawing, forming part of this specification, in which—

Similar letters of reference in each of the figures indicate corresponding parts.

Figure 1:
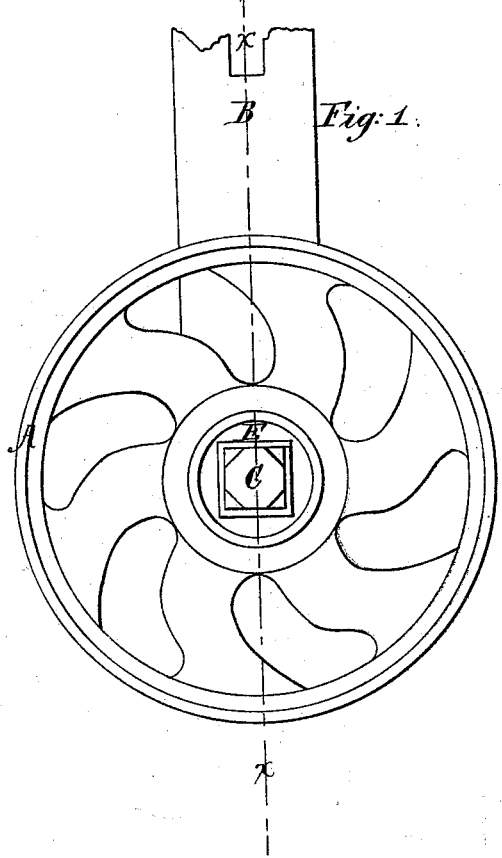
Figure 1 is a side view of the wheel and axle.
Figure 2:
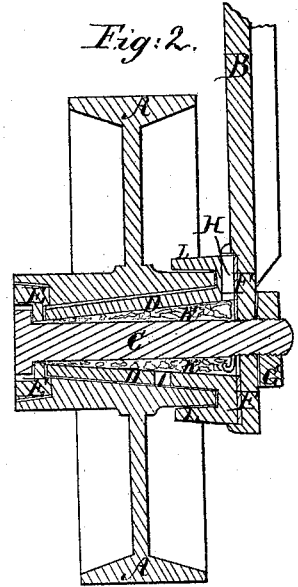
Figure 2 is a sectional view in the line $x\,x$, fig. 1.

The nature of our invention consists in constructing a self-lubricating axle, which can be attached to the grain-wheel of a harvesting-machine, to the trucks to hold the master-wheel of a horse-power, to the wheels of wagons and buggies, or, in fact, to any wheel that runs, and be so compact as to keep out the dust and dirt, and be easily constructed and operated.

A is the wheel.

B, a standard to which the axle is attached, with which to secure it, for any purpose that may be required.

C, a bolt, which holds the axle to the standard B.

D, the axle.

E, the nut which holds the wheel to the axle, and sets in flush, so as to keep the dirt from working in, to interrupt the working of the axle.

F, the packing between the axle D and standard B, to prevent the oil from running out and being wasted.

G, the nut to hold the bolt C, and, by that means, axle D, up to standard B.

H, the opening through which to pour oil into the inside of the axle D.

I, the opening on the opposite side of the axle, for the oil to work out and lubricate the axle.

K, the opening on the inside of the axle, for oil, and waste to hold the oil, and let it drip out as wanted.

L, the lip on the axle D, lapping over the hub of wheel A, to keep the dirt out of the wheel.

Operation.

Put the axle together as shown. Pour oil into the opening H, which will be taken up by the waste on the inside of the axle, and will weep through to the opposite side of the axle, and keep the wheel and axle self-lubricated, and keep all dirt from the wheel and axle.

What we claim as our invention, and desire to secure by Letters Patent, is—

Standard B, bolt C, hollow axle D, nut E, packing F, holes H and I, and flange L, constructed and arranged substantially as described.

G. E. CLARKE.
ED. P. DICKEY.

Witnesses:
J. B. SMITH,
W. M. HOWSON.